US009329289B2

(12) United States Patent
Le Ravalec

(10) Patent No.: US 9,329,289 B2
(45) Date of Patent: May 3, 2016

(54) METHOD OF CONSTRUCTING A GRID REPRESENTATIVE OF A PROPERTY DISTRIBUTION BY CONDITIONAL MULTIPOINT STATISTICAL SIMULATION

(71) Applicant: IFP Energies nouvelles, Rueil-Malmaison (FR)

(72) Inventor: Mickaele Le Ravalec, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/538,931

(22) Filed: Nov. 12, 2014

(65) Prior Publication Data
US 2015/0131866 A1    May 14, 2015

(30) Foreign Application Priority Data
Nov. 14, 2013  (FR) .................................... 13 61103

(51) Int. Cl.
*G06K 9/00* (2006.01)
*G01V 1/30* (2006.01)
*G01V 11/00* (2006.01)
*G06K 9/66* (2006.01)
*G06T 17/05* (2011.01)
*G01V 99/00* (2009.01)
*G06F 17/50* (2006.01)

(52) U.S. Cl.
CPC ...... *G01V 1/30* (2013.01); *G01V 11/00* (2013.01); *G01V 99/005* (2013.01); *G06K 9/0063* (2013.01); *G06K 9/66* (2013.01); *G06T 17/05* (2013.01); *G01V 2210/665* (2013.01); *G06F 17/5009* (2013.01); *G06F 2217/16* (2013.01)

(58) Field of Classification Search
None
See application file for complete search history.

(56) References Cited

U.S. PATENT DOCUMENTS

| 2005/0216238 | A1* | 9/2005 | Teshima | G06T 17/00 703/2 |
| 2006/0265204 | A1* | 11/2006 | Wallis | G06F 17/5018 703/10 |
| 2009/0006057 | A1* | 1/2009 | Niu | G06F 17/5018 703/10 |
| 2009/0217228 | A1* | 8/2009 | Melzner | G06F 17/5077 716/122 |

(Continued)

OTHER PUBLICATIONS

Parra, Alvaro et al: "Adapting a Texture Synthesis Algorithm for Conditional Multiple Point Geostatistical Simulation," Stochastic Environmental Research and Risk Assessment, Springer, Berlin, DE, vol. 25, No. 8, May 1, 2011, pp. 1101-1111, XP019982279, ISSN: 1436-3259, DOI: 10.1007/S0047-011-0489-1.

(Continued)

*Primary Examiner* — Shervin Nakhjavan
(74) *Attorney, Agent, or Firm* — Fitch, Even, Tabin & Flannery LLP

(57) ABSTRACT

The invention is a method using a computer to construct a grid representative of the distribution of a physical property of an underground formation having application to petroleum reservoir development. A set of initial grid cells MI containing at least one conditioning point PC is defined. Each cell MI is then visited and assigned a value representative of the property using a filling method. At least one unvisited cell (MNV1, MNV2) adjacent to at least one already visited cell MV is then identified, and the number N of adjacent cells MV is determined for each cell (MNV1, MNV2). Each cell (MNV1, MNV2) is then visited and filled according to the decreasing values of N. The stages of identification and filling of cells (MNV1, MNV2) are repeated until each cell of the grid has been visited.

35 Claims, 2 Drawing Sheets

PC
 MI
 MNV1
 MNV2

(56) References Cited

U.S. PATENT DOCUMENTS

| | | | |
|---|---|---|---|
| 2011/0251833 A1 | 10/2011 | Mariethoz et al. | |
| 2011/0310101 A1* | 12/2011 | Prange | G01V 99/00 345/420 |
| 2011/0313745 A1* | 12/2011 | Mezghani | G01V 99/00 703/10 |
| 2012/0158378 A1* | 6/2012 | Enchery | G01V 11/00 703/2 |
| 2013/0110484 A1 | 5/2013 | Hu et al. | |
| 2013/0124161 A1* | 5/2013 | Poudret | G01V 99/005 703/2 |
| 2013/0138406 A1* | 5/2013 | Khvoenkova | E21B 41/0092 703/2 |
| 2013/0262051 A1 | 10/2013 | Plost et al. | |
| 2013/0262053 A1* | 10/2013 | Plost | G01V 99/005 703/2 |
| 2014/0046636 A1* | 2/2014 | Mustapha | G06F 17/5018 703/2 |
| 2014/0136171 A1* | 5/2014 | Sword, Jr. | G06F 17/5009 703/10 |
| 2015/0100293 A1* | 4/2015 | Hoteit | G01V 99/005 703/10 |

OTHER PUBLICATIONS

Yong, Ge, et al: "Solution of Multiple-Point Statistics to Extracting Information From Remotely Sensed Imagery," Journal of China University of Geosciences, vol. 19, No. 4, Aug. 1, 2008, pp. 421-428, XP025686142, ISSN: 1002-0705, DOI 10.1016/S1002-0705(08)60076-X.

Burc Arpat, G., et al: "Conditional Simulation with Patterns," Mathematical Geology, Kluwer Academic Pulbishers-Plenum Publishers, NE, vol. 39, No. 2, Apr. 2, 2007, pp. 177-203, XP019506006, ISSN: 1573-8868, DOI: 10.1007/S11004-006-9075-3.

Yuhong, Liu et al: "Improving Sequential Simulation With a Structured Path Guided by Information Content," Mathematical Geology, vol. 36, No. 8, Nov. 1, 2004, pp. 945-964, XP055121677, DOI:10.1023/B:MATG.0000048800.72104.de.

* cited by examiner

TI

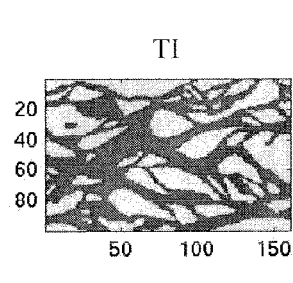
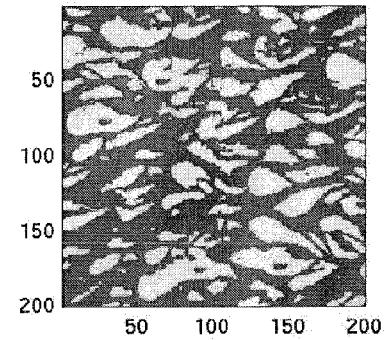
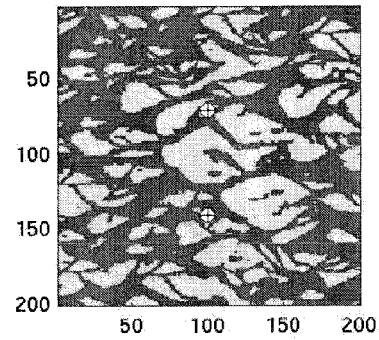
FIG. 3A
FIG. 3B
FIG. 3C
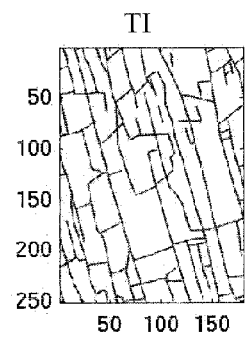
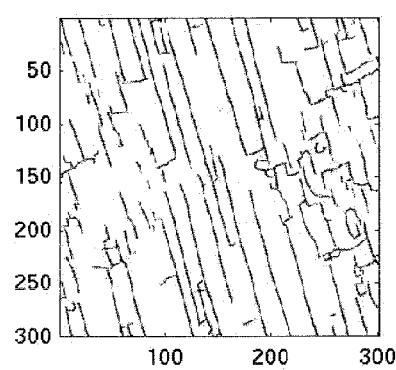
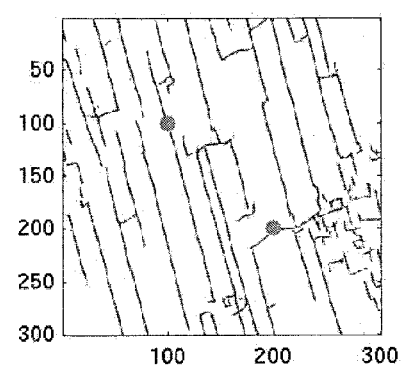
FIG. 4A
FIG. 4B
FIG. 4C

METHOD OF CONSTRUCTING A GRID REPRESENTATIVE OF A PROPERTY DISTRIBUTION BY CONDITIONAL MULTIPOINT STATISTICAL SIMULATION

CROSS REFERENCE TO RELATED APPLICATION

Reference is made to French Patent Application Serial Number FR 13/61.103, filed Nov. 14, 2013, which is incorporated herein by reference in its entirety.

BACKGROUND OF THE INVENTION

1. Field of the Invention

The present invention relates to the petroleum industry, and more particularly to the exploration and development of petroleum reservoirs or of geological gas storages sites.

2. Description of the Prior Art

Studying a petroleum field requires constructing models using a computer referred to broadly as geological models. These models are well known and widely used in the petroleum industry which allow determination of many technical parameters relative to prospecting, study or development of a hydrocarbon reservoir. Indeed, a geological model has to be representative of the structure of a reservoir and of the behavior thereof. It is thus for example possible to determine which zones are most likely to contain hydrocarbons, the zones in which it can be appropriate to drill an injection well in order to enhance hydrocarbon recovery, the type of tools to use, the properties of the fluids used and recovered, etc.

This type of subsoil model is most often represented in a computer (it is then referred to as a numerical model), by a mesh or grid which is generally three-dimensional. Each grid cell is characterized by one or more petrophysical properties (facies, porosity, permeability, saturation, etc.). Due to the limitation of available external information (limited number of wells, cores, etc.), filling of the cells requires using construction methods referred to as probabilistic. For interpretation of these grids in terms of technical operating parameters, the cells need to be filled as faithfully as possible to reality. Filling of the cells must therefore take into account of the available external information, but it also has to account for the continuity and the connectivity of the geological structures studied.

BACKGROUND OF THE INVENTION

The following documents will be mentioned in the description below:

Efros, A. A., Leung, T. K., 1999, Texture Synthesis by Non-Parametric Sampling, The Proceedings of the Seventh IEEE International Conference on Computer Vision, 2, 1033-1038, http://dx.doi.org/10.1109/ICCV.1999.790383, Guardiano, F., Srivastava, M., 1993, Multivariate Geostatistics: Beyond Bivariate Moments, in: Soares, A. (Ed.), Geostatistics-Troia. Kluwer Academic Publications, Dordrecht, 133-144, http://dx.doi.org/10.1007/978-94-011-1739-5 12, Müller, C., Siegesmund, S., Blum, P., 2010, Evaluation of the Representative Elementary Volume (REV) of a Fractured Geothermal Sandstone Reservoir, Environ. Earth Sci., 61, 1713-1724, http://dx.doi.org/10.1007/s.12665-010-0485-7, Strebelle, S., 2002, Conditional Simulation of Complex Geological Structures Using Multiple-Point Statistics, Mathematical Geology, 34(1), 1-21, Wei, L. Y., Levoy, M., 2000, Fast Texture Synthesis Using Tree-Structured Vector Quantization, SIGGRAPH'00, Proceedings of 27$^{th}$ Ann. Conf. Comp. Graphics Inter. Techn., 479-488, http://dx.doi.org/10.1145/344779.345009.

The concept of multipoint statistical simulation was introduced by Guardiano and Srivastava (1993). The significance of multipoint statistical simulation methods in relation to two-point statistical simulation methods is to enable generation of geological models comprising geological objects of complex shape, notably curvilinear. The principle of these methods provides information on the shape of the objects, their spatial distribution, and the way they are connected through the agency of a training image. This image can be a satellite image, a realization of another simulation method (an object method or a genetic process for example), a high-resolution seismic map, etc. A window that goes through the training image in order to capture the occurrence of the value configurations present is then defined. The training image thus acts as a substitute for the variogram which the two-point simulation methods refer to. Knowing the training image, it is desired to simulate a new image reproducing the shapes detected in the training image. The multipoint statistical simulation mode is sequential and the cells of the image to be simulated are visited one after the other in random order. From a practical point of view, it was not until Strebelle's teaching (2002) that a first algorithm, efficient enough to be usable, was implemented.

In parallel, analogous techniques known as texture synthesis methods have been developed in the field of computer graphics. Again, the principle of these methods refers to using a computer to provide a training image comprising patterns that are attempted to be reproduced in the simulated image. The information provided by this training image is extracted by a window that is slid over the image. This image synthesis is very rich and much work has been reported in the literature (for example (Efros and Leung, 1999) or (Wei and Levoy, 2000)). The cell visiting order in the case of texture synthesis is not random. For example, in the case of Efros and Leung (1999), the simulation process starts with the cell in the middle of the image to be simulated. Its closest neighbours are then sought, and then the closest neighbours of the closest neighbours, etc. A sequence of increasingly large concentric crowns is then obtained. In the case of Wei and Levoy (2000), the authors recommend that the cells of the image be visited in a predetermined order: from left to right and from bottom to top.

In order to be as representative of reality as possible and to allow optimum development of a reservoir, the construction of geological models must be able to account for any available external data such as, for example, measurements on cores extracted from wells or logging data.

Texture synthesis methods do not allow external data to be taken into account. Due to the absence of external data, the cells can be visited in a predetermined order. By visiting the cells close to those already containing values, the lateral extension of the objects is better preserved. Besides, smaller windows can be considered, which implies calculation time gains.

Multipoint statistical simulation methods allow external data to be taken into account in which event they are then referred to as conditional. In order to take into account of the conditioning points, they involve a random visiting order for the grid cells. In order to correctly reproduce large-size structures, this random visiting order requires consideration of windows of very large size, which has a time-consuming calculation. An effect referred to as "pixellation" (lack of continuity, from one cell to the next, of the physical property represented) can also sometimes be observed. The methods described in U.S. Published Patent Applications 2013/0,110, 484 and 2011/0,251,833 introduce for the first time in the field of multipoint statistical simulation a possibility not necessarily requiring random path. The specification of a unilateral path is disclosed in U.S. Published Application 2011/0,251, 833. However, although this path is mentioned, the path construction technique is not explained and its advantages are not shown.

SUMMARY OF THE INVENTION

The present invention provides a method of constructing with a computer geological models by multipoint statistical simulation, with a cell visiting order defined according to a deterministic approach, while allowing integration of external data.

The present invention thus relates to a method of using a computer to construct a grid representative of the distribution of a physical property of an underground formation by multipoint statistical simulation, from at least one conditioning point where the value of the property is known. Each cell of the grid is associated with a geographical position. The method comprises the following stages:

a) defining a set of initial cells MI containing at least one of the conditioning points;

b) visiting each initial cell MI of the set and assigning to each cell MI a value representative of the property using a filling method constrained by at least one of the conditioning points;

c) identifying at least one unvisited cell MNV adjacent to at least one already visited cell MV and determining the number N of adjacent visited cells MV for each cell MNV;

d) visiting each unvisited cell MNV according to a decreasing order of the value of N and assigning to each cell MNV a value representative of the property using a filling method constrained by at least one adjacent cell MV; and e) repeating c) to d) until each cell of the grid has been visited.

According to the invention implemented with two conditioning points, the set of the initial cells MI can be defined by the cells intersected by a continuous path passing through the conditioning points.

According to the invention implemented with at least three conditioning points, the set of the initial cells MI can be defined by the cells intersected by a continuous closed path passing through the conditioning points.

According to the invention, the path can have line segments connecting the conditioning points.

According to the invention, a cell can be defined as adjacent to another cell if the distance between the respective centers thereof is below a predetermined threshold.

According to the invention, the method of filling a cell M of the grid containing no conditioning point can be carried out from a training image TI representative of the property, according to the following stages:

positioning a window F of any shape centered on cell M of the grid;

associating with cell M a pattern MM formed by the configuration of the values of the property at the conditioning points and/or in the adjacent cells MV contained in window;

extracting at least one sub-image STI from training image TI;

selecting a pattern MSTI representative of MM from among the various patterns formed by the configuration of the values of the property present in each sub-image STI;

extracting from the pattern MSTI a subset of cells of any shape whose values are assigned to the subset of cells of same size and of same shape centered on cell M of said grid.

According to the invention, the subsets of cells can be a single cell.

According to the invention, the training image TI can be constructed.

According to the invention, pattern MSTI can correspond to the pattern whose distance to pattern MM is the shortest, notably in the sense of norm Ln with n={1,2}.

According to the invention, pattern MSTI can be randomly selected from among a group of patterns whose distance to pattern MM, notably of norm Ln with n={1,2}, is below a predetermined threshold.

According to the invention, the property can be of categorical type and the pattern MSTI selected can correspond to a random draw from a probability law relative to the patterns of the training image TI.

According to the invention, the physical property can correspond to a discrete variable of geological facies type or to a continuous variable of porosity or permeability type.

A computer program product downloadable from a communication network and/or recorded on a computer-readable medium and/or processor executable, comprising program code instructions for implementing the method according to the invention, when the program is executed on a computer, can be constructed.

An underground formation development method can be defined by carrying out the following stages:

constructing a grid representative of a distribution of a physical property by use of the grid construction method described according to the invention;

determining an optimum reservoir development scheme from the grid; and developing the reservoir by implementing the optimum development scheme.

BRIEF DESCRIPTION OF THE DRAWINGS

Other features and advantages of the method according to the invention will be clear from reading the description hereafter of non-limitative embodiment examples, with reference to the accompanying figures wherein:

FIGS. 3A to 3C show the present invention accounting for conditioning points in an application case of a braided channel type;

FIGS. 4A to 4C illustrate, in a fracture network case, that the conditioning points are satisfied by the method according to the invention.

DETAILED DESCRIPTION OF THE EMBODIMENTS

Figure 1:
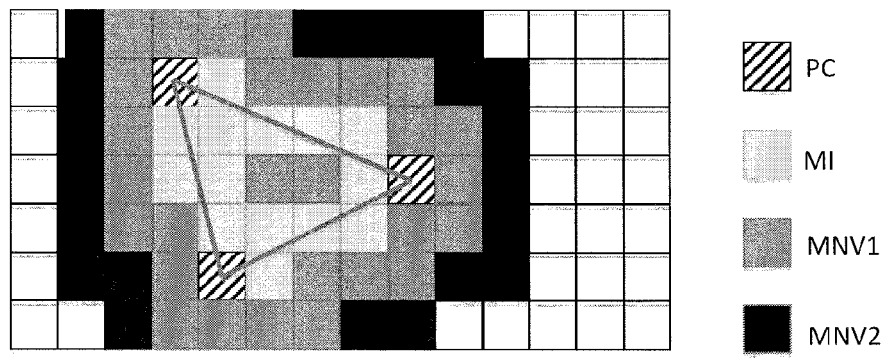
FIG. 1 shows an example of construction of the visiting order for the cells of a grid in cases where three conditioning points are available.

The following definitions are used in the description of the invention:

A training image TI is an image representative of the physical property being studied, which provides information on the shape of the objects being studied, their spatial distribution and the way they are connected. It is given in form of a grid comprising a set of cells;

A training sub-image STI is a subset of cells extracted from training image TI;

A window F is an object that is slid over the training image to assess the occurrence of groups of values of the physical property being studied with the values being those of the cells contained in the window with a window being centered on a cell;

A pattern is the configuration of values of the physical property being studied in a group of cells contained in a window centered on a given cell, Conditioning points PC are points where the value of the physical property being studied is known with these conditioning points possibly corresponding to external data obtained from cores or wells for example.

The present invention is a method of representing a geological model of the subsoil in the form of a grid from a training image and external data given at conditioning points. This invention is based on the use of a deterministic cell visiting order while implementing a conditional multipoint statistical simulation. The desired physical property is to be represented as a grid of a discrete variable of geological facies type or a continuous variable of porosity or permeability type. The grid constructed by the present invention can be two-dimensional as well as three-dimensional.

The present invention comprises using a programmed computer to perform at least the following stages:
a) defining a set of initial cells MI containing at least one of the conditioning points;
b) visiting each initial cell MI of the set and assigning to each cell MI a value representative of the property using a filling method constrained by at least one of the conditioning points;
c) identifying at least one unvisited cell MNV adjacent to at least one already visited cell MV and determining the number N of adjacent visited cells MV for each cell MNV;
d) visiting each unvisited cell MNV according to a decreasing order of the value of N and assigning to each cell MNV a value representative of the property using a filling method constrained by at least one adjacent cell MV;
e) repeating c) to d) until each cell of the grid has been visited.

The main stages of the present invention are described in detail hereafter.

Defining a Set of Initial Cells MI

This first stage defines the set of cells MI from which the multipoint statistical simulation process is initialized. The goal of this initialization stage is to prevent the appearance of discontinuities during filling of the grid.

According to a first preferred embodiment of the present invention for which at least three conditioning points are used or available, this set of initial cells is formed as follows:
identifying the cells containing the conditioning points;
connecting the conditioning points by a continuous closed path;
identifying the cells intersected by the defined path which then belong to the set of initial cells.

The set of cells thus identified makes up the set of initial cells MI.

Preferably, the continuous closed path is obtained by connecting the conditioning points with line segments.

According to a second embodiment of the present invention for which only two conditioning points are used or available, the path defined above can be a continuous path connecting the two conditioning points in question.

According to a third embodiment of the present invention for which a single conditioning point is used or available, the required set of initial cells can consist of the cell containing the conditioning point in question.

An illustration of this stage in the case of three conditioning points is given in FIG. 1. In this figure, conditioning points PC are identified by hatched cells. They are connected to one another by line segments so as to form a continuous closed path (full lines forming a triangle whose vertices are the conditioning points). The cells intersected by these line segments then correspond to the desired initial cells MI (light grey cells).

Filling the Initial Cells MI

The initial cells MI thus identified are then visited in any order and a value of the physical property studied is assigned to each cell according to a filling method described below.

When a cell contains a conditioning point, the value of the physical property known at this point is directly assigned to the cell.

The cells thus visited and filled are denoted by MV hereafter.

Determining the Visiting Order for Unvisited Cells MNV

This third stage determines the visiting order for the cells that have not yet been visited which is denoted by MNV hereafter.

In this stage, the cells that are not yet visited MNV which are adjacent to the already visited cells MV are identified. A cell is considered to be adjacent to another cell if the distance between these two cells is below a predetermined threshold, and the distance can be understood as a physical distance as well as a distance in number of cells. According to a preferred embodiment of the method, two cells are considered to be adjacent to one another if there is no other cell between them.

The number N of adjacent visited cells MV, in the sense of the above definition, is then determined for each unvisited cell MNV. The visiting order is defined for cells MNV by arranging the cells according to their decreasing value of N. The unvisited cells MNV with the largest number of already visited adjacent filled cells MV are thus visited first.

This visiting order allows the grid to be filled step by step, starting from the cells with the least number of empty cells in their vicinity, so as to benefit from the knowledge of the values relative to the property to be modelled in this vicinity.

An illustration of this stage is given in FIG. 1. If it is considered that two cells are adjacent if there is no other cell between them, then the set of unvisited cells MNV which are desired corresponds to the cells appearing in FIG. 1 in dark grey or black, depending on whether the case illustrated corresponds to iteration 1 (MNV1) or iteration 2 (MNV2) of the process (see "Iterative process" hereafter). Filling the unvisited cells MNV Each cell MNV is then visited according to the previously established visiting order and assigned a value representative of the physical property studied by using a filling method described hereafter.

Iterative Process

If, at the end of a stage of filling cells MNV, the grid of interest comprises cells that have not been visited, the stages "Determining the visiting order for unvisited cells MNV" and "Filling the unvisited cells MNV" are repeated until all of the cells of the grid have been visited.

Filling Process

The filling process is applied in stages "Filling the initial cells MI" and "Filling the unvisited cells MNV" described above. It fills the cells that are still empty with an appropriate value of the physical property being studied by using as the constraint the known studied property values, such as the values at the conditioning points and/or the values at the already visited cells MV.

When a cell contains a conditioning point, the value of the physical property known at this point is directly assigned to the cell.

According to an embodiment of the present invention in the case of a cell M containing no conditioning point, this stage is carried out as follows:

positioning a window F of any size and shape centered on cell M of the grid, and window F can notably be a square or a rectangle centered on cell M. All of the empty cells and of the cells already containing physical property values make up a pattern associated with this cell M, which is referred to as "reference pattern" hereafter and denoted by MM;

Randomly extracting at least one sub-image STI from training image TI. Each training sub-image STI is scrolled through and the various patterns formed by the configuration of the values of the property studied are identified in each training sub-image; and Selecting from among the various patterns identified in each sub-image STI a pattern denoted by MSTI that is representative of reference pattern MM, by comparing the identified patterns with the reference pattern. The comparison can be made according to different embodiments, among which:

The pattern MSTI of the training sub-image that is the closest to reference pattern MM can for example be selected as in (Wei and Levoy, 2000). Various metrics can be used to measure the distance between a pattern of the training sub-image STI and the reference pattern. In a preferred embodiment, norm L1 or norm L2 is used to measure this distance;

It is also possible to identify all of the patterns of the training sub-image STI that are the closest to reference pattern MM using, as in the previous embodiment, a notion of distance based on the appropriate metrics. A probability law can be deduced therefrom. A random draw is then performed to select the pattern MSTI from this sub-set (Efros and Leung, 1999);

A third variant can store all of the patterns identified in the training image and deduce therefrom probability laws used to generate the values to be assigned to the grid cells (Strebelle, 2002). This approach does not require definition of a distance and it is valid only for the simulation of realizations of discrete variables such as facies; and extracting from the selected pattern MSTI a subset of cells of any shape and assigning the values of this subset to the subset of cells of same shape and of same size which are centered on cell M of the grid.

According to an embodiment of the present invention, the subset of cells extracted from pattern MSTI comprises a single cell, as well as the subset of cells centered on cell M.

Constructing Training Image TI

According to an embodiment of the present invention, an additional prior stage constructs the training image TI. This image can correspond to a satellite image, a realization of another simulation method (an object method or a genetic process for example), a high-resolution seismic map, etc.

Moreover, the invention relates to an underground formation development method wherein the following stages are carried out:

constructing a grid representative of the distribution of a physical property using a grid construction method as described above;

determining an optimum reservoir development scheme from the grid; and developing the reservoir using the optimum development scheme.

From the representative grid obtained in the previous stages, several development schemes can be determined corresponding to different possible underground reservoir development configurations: location of the production and/or injection wells, target values for the flow rates per well and/or for the reservoir, the type of tools used, the fluids used, injected and/or recovered, etc. For each scheme, the production estimates need to be determined. These probabilistic production estimates can be obtained by flow simulation software and a calibrated numerical reservoir model. Reservoir simulation is a technique allowing fluid flows within a reservoir to be simulated using a software referred to as flow simulator and the reservoir model. For example, the PumaFlow® software (IFP Energies nouvelles, France) is a flow simulator.

One or more possible development schemes suited to the reservoir model (also referred to as geological model) are defined. For each scheme, the responses are determined by simulation.

From the probabilistic production estimates defined for each development scheme, selection can occur by comparison the development scheme considered to be the most pertinent. For example:

by comparing the maximum volume of oil recovered, the production scheme likely to provide the maximum recovery rate or to be the most profitable can be determined; and by comparing the standard deviation of the oil volume recovered, the least risky production scheme can be determined.

The reservoir is then developed according to the development scheme defined, for example by drilling new (production or injection) wells, by modifying the tools used, by modifying the flow rates and/or the nature of the fluids injected, etc.

The invention furthermore relates to a computer program product downloadable from a communication network and/or recorded on a computer-readable medium and/or processor executable. This program comprises program code instructions for implementing the method as described above, when the program is executed on a computer.

APPLICATION EXAMPLES

The features and advantages of the method according to the invention will be clear from reading the application examples hereafter.

Figure 2A:
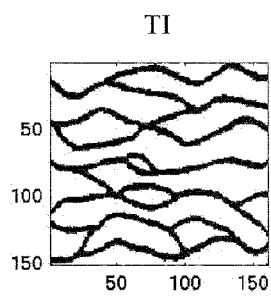
FIGS. 2A to 2F illustrate the interest of using a deterministic visiting order for the cells of a grid in relation to a random visiting order in the case of imbricated channels.
Figure 2B:
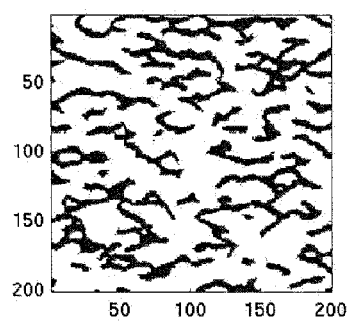
Figure 2C:
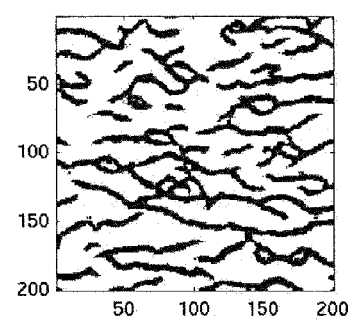
Figure 2D:
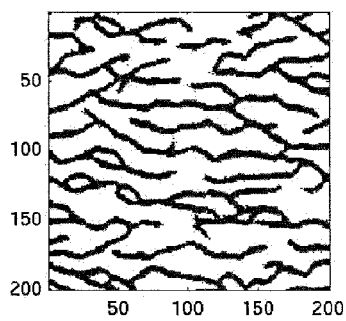
Figure 2E:
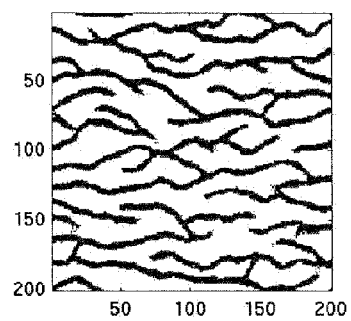
Figure 2F:
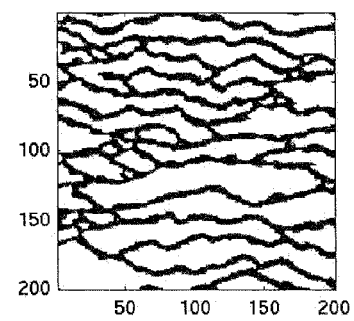

The example illustrated in FIGS. 2A-2F shows the use of a deterministic cell visiting order as provided in the present invention in order to reproduce, by use of a conditional multipoint statistical method, the structures observed in a training image. The training image TI used in this example is presented in FIG. 2A. This well-known image comprises many channels. Due to the high continuity and lateral connectivity of the structures to be shown, this image is often used to compare the strengths and weaknesses of various multipoint statistical simulation methods. FIGS. 2B to 2E show realizations simulated according to a method of the prior art using a multipoint statistical method with random path for different window sizes (11×11 cells, 15×15 cells, 19×19 cells and 23×23 cells respectively). FIG. 2F shows a realization according to the invention simulated with a multipoint statistical method with a predetermined path for an 11×11-cell window size. It can be seen in this example that, when the cell visiting order is random, it is difficult to reproduce the continuity and the connectivity of large-size structures with small-size windows. Indeed, for a window with 11×11 cells (FIG. 2B), the simulated objects are small and greatly disconnected. The simulated structure is significantly different from the structure represented by the training image. Larger windows therefore need to be used. Thus, with a 23×23-cell window (FIG. 2E), the simulated image is closer to the training image. However, the larger the windows, the greater the calculation times and the memory requirements. Furthermore, even though channels running across the image are obtained under such conditions, the connectivity remains lower than in the training image. On the other hand, when following a deterministic visiting order as provided by the invention, an 11×11-cell window is sufficient to reproduce the structure of the training image (FIG. 2F).

The second application example shown in FIGS. 3A-3C shows that using a deterministic path to implement a multipoint statistical simulation method allows satisfaction of the available conditioning points. The training image (TI) used in this example is shown in FIG. 3A. This image comprises braided channels and has 160×99 cells. This image is considered to contain two facies: the "channel" facies (black in FIG. 3) and the "country rock" facies (light grey in FIGS. 3A-3C), and that the conditioning points are located in the "country rock" facies. Two realizations of dimension 200×200 cells are generated from this training image: a realization without conditioning points referred to as conditional realization (FIG. 3B) according to a method of the prior art and a realization with conditioning points referred to as non-conditional realization (FIG. 3C) according to the invention. The dimension of the window used for these realizations is 25×25 cells. It can be determined that the simulated images correctly reproduce the structures observed in the training image. Furthermore, it can also be seen that the conditional realization according to the invention respects, as desired, the observations made at the conditioning points (black crosses on white background in FIG. 3C).

In a third example shown in FIGS. 4A-4C, it is desired to correctly reproduce the characteristics of a fracture network while satisfying conditioning points. The training image which is considered has a size 181×251 cells and corresponds to the map of a real fracture network (Müller et al., 2010). Two categories are considered here which are a "fracture" category and a "country rock" category. A window of size 13×13 cells is used for the multipoint statistical simulation in this example, and a non-conditional realization is generated according to a method of the prior art, as well as a realization according to the invention constrained by the presence of fractures at two points (black discs in FIG. 4C). The dimension of both realizations is 300×300 cells. They show fracture networks that are very similar to the one shown in the training image where the preferred orientation of the fractures, their dimensions and density are also to be found.

The invention claimed is:

1. A method of constructing with a programmed computer a grid representative of a distribution of a physical property of an underground formation by multipoint statistical simulation, from at least one conditioning point where a value of the property is known and each cell of the grid is associated with a geographical position, comprising:

a) defining a set of initial cells containing at least one of the conditioning points;

b) visiting each initial cell of the set of initial cells and assigning to each cell a value representative of the property using a filling method constrained by at least one of the conditioning points;

c) identifying at least one unvisited cell adjacent to at least one already visited cell and determining a number of adjacent visited cells for each unvisited cell;

d) visiting each unvisited cell according to a decreasing order of a value of the number and assigning to each unvisited cell a value representative of the property using a filling method constrained by at least one adjacent visited cell;

e) repeating c) to d) until each cell of the grid has been visited; and f) using the grid to develop the underground formation.

2. A method as claimed in claim 1, implemented with two conditioning points, wherein the set of the initial cells is defined by cells intersected by a continuous path passing through the two conditioning points.

3. A method as claimed in claim 2, wherein the path has line segments connecting the conditioning points.

4. A method as claimed in claim 3, wherein a cell is defined as adjacent to another cell if a distance between respective centers thereof is below a predetermined threshold.

5. A method as claimed in claim 4, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

6. A method as claimed in claim 3, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

7. A method as claimed in claim 2, wherein a cell is defined as adjacent to another cell if a distance between respective centers thereof is below a predetermined threshold.

8. A method as claimed in claim 7, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

9. A method as claimed in claim 2, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

10. A method as claimed in claim 2, wherein the training image TI is constructed.

11. A method as claimed in claim 10, wherein the pattern corresponds to a pattern whose distance to the pattern formed by the configuration is a norm with n={1,2}.

12. A method as claimed in claim 10 wherein the pattern is randomly selected from among a group of patterns whose distance to the pattern representative of the pattern from among the patterns is a norm Ln with n={1,2}, is below a predetermined threshold.

13. A method as claimed in claim 10, wherein the property is a categorical type and the pattern representative of the pattern corresponds to a random draw from a probability law relative to patterns of the training image.

14. A method as claimed in claim 2, wherein the physical property corresponds to a discrete variable of geological facies or to a continuous variable of porosity or permeability.

15. A method as claimed in claim 1, implemented with at least three conditioning points, wherein the set of the initial cells is defined by cells intersected by a continuous closed path passing through the at least three conditioning points.

16. A method as claimed in claim 15, wherein the path has line segments connecting the conditioning points.

17. A method as claimed in claim 16, wherein a cell is defined as adjacent to another cell if a distance between respective centers thereof is below a predetermined threshold.

18. A method as claimed in claim 17, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

19. A method as claimed in claim 16, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

20. A method as claimed in claim 15, wherein a cell is defined as adjacent to another cell if a distance between respective centers thereof is below a predetermined threshold.

21. A method as claimed in claim 20, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

22. A method as claimed in claim 15 wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

23. A method as claimed in claim 1, wherein a cell is defined as adjacent to another cell if a distance between respective centers thereof is below a predetermined threshold.

24. A method as claimed in claim 23, wherein the method of filling a cell of the grid containing no conditioning point is carried out from a training image representative of the property, comprising:

positioning a window of any shape centered on the cell of the grid;

associating with the cell a pattern formed by a configuration of values of the property at conditioning points and/or in an adjacent cell contained in the window;

extracting at least one sub-image from the training image;

selecting a pattern representative of the pattern from among the patterns formed by the configuration of the values of the property present in each sub-image;

extracting from the pattern a subset of cells of any shape with values assigned to the subset of cells of a same size and of a same shape centered on the cell of the grid.

25. A method as claimed in claim 1, wherein the method of filling a cell of the grid containing no conditioning point is carried out from a training image representative of the property, comprising:
- positioning a window of any shape centered on the cell of the grid;
- associating with the cell a pattern formed by a configuration of values of the property at conditioning points and/or in an adjacent cell contained in the window;
- extracting at least one sub-image from the training image;
- selecting a pattern representative of the pattern from among the patterns formed by the configuration of the values of the property present in each sub-image;
- extracting from the pattern a subset of cells of any shape with values assigned to the subset of cells of a same size and of a same shape centered on the cell of the grid.

26. A method as claimed in claim 25, wherein the subsets of cells is a single cell.

27. A method as claimed in claim 26, wherein the pattern corresponds to a pattern whose distance to the pattern formed by the configuration is a norm with n={1,2}.

28. A method as claimed in claim 26 wherein the pattern is randomly selected from among a group of patterns whose distance to the pattern representative of the pattern from among the patterns is a norm with n={1,2}, is below a predetermined threshold.

29. A method as claimed in claim 26, wherein the property is a categorical type and the pattern representative of the pattern corresponds to a random draw from a probability law relative to patterns of the training image.

30. A method as claimed in claim 25, wherein the pattern corresponds to a pattern whose distance to the pattern formed by the configuration is a norm with n={1,2}.

31. A method as claimed in claim 25 wherein the pattern is randomly selected from among a group of patterns whose distance to the pattern representative of the pattern from among the patterns is a norm with n={1,2}, is below a predetermined threshold.

32. A method as claimed in claim 25, wherein the property is a categorical type and the pattern representative of the pattern corresponds to a random draw from a probability law relative to patterns of the training image.

33. A computer program product stored on a non-transitory computer readable medium comprising program code instructions which, when executed on a computer, constructs with a programmed computer a grid representative of a distribution of a physical property of an underground formation by multipoint statistical simulation, from at least one conditioning point where a value of the property is known and each cell of the grid is associated with a geographical position by performing the steps with a programmed computer comprising:
- a) defining a set of initial cells containing at least one of the conditioning points;
- b) visiting each initial cell of the set of initial cells and assigning to each cell a value representative of the property using a filling method constrained by at least one of the conditioning points;
- c) identifying at least one unvisited cell adjacent to at least one already visited cell and determining a number of adjacent visited cells for each unvisited cell;
- d) visiting each unvisited cell according to a decreasing order of a value of the number and assigning to each unvisited cell a value representative of the property using a filling method constrained by at least one adjacent visited cell; and
- e) repeating c) to d) until each cell of the grid has been visited.

34. An underground formation development method, comprising:
using a programmed computer to construct a grid representative of a distribution of a physical property by performing a method of constructing a grid representative of a distribution of a physical property of an underground formation by multipoint statistical simulation, from at least one conditioning point where a value of the property is known and each cell of the grid is associated with a geographical position, comprising:
- a) defining a set of initial cells containing at least one of the conditioning points;
- b) visiting each initial cell of the set of initial cells and assigning to each cell a value representative of the property using a filling method constrained by at least one of the conditioning points;
- c) identifying at least one unvisited cell adjacent to at least one already visited cell and determining a number of adjacent visited cells for each unvisited cell;
- d) visiting each unvisited cell according to a decreasing order of a value of the number and assigning to each unvisited cell a value representative of the property using a filling method constrained by at least one adjacent visited cell; and
- e) repeating c) to d) until each cell of the grid has been visited;
- f) determining an optimum reservoir development scheme from the grid; and
- (g) developing the reservoir by implementing the optimum development scheme.

35. A method of constructing with a programmed computer a grid representative of a distribution of a physical property of an underground formation by multipoint statistical simulation, from at least one conditioning point where a value of the property is known and each cell of the grid is associated with a geographical position, comprising performing steps with a computer of:
- a) defining a set of initial cells containing at least one of the conditioning points;
- b) visiting each initial cell of the set of initial cells and assigning to each cell a value representative of the property using a filling method constrained by at least one of the conditioning points;
- c) identifying at least one unvisited cell adjacent to at least one already visited cell and determining a number of adjacent visited cells for each unvisited cell;
- d) visiting each unvisited cell according to a decreasing order of a value of the number and assigning to each unvisited cell a value representative of the property using a filling method constrained by at least one adjacent visited cell; and
- e) repeating c) to d) until each cell of the grid has been visited.

* * * * *